United States Patent
Vilhelmsen et al.

(10) Patent No.: US 11,704,952 B2
(45) Date of Patent: Jul. 18, 2023

(54) ADAPTIVE GATELINE MOTOR CONTROL

(71) Applicant: Cubic Corporation, San Diego, CA (US)

(72) Inventors: Tom Vilhelmsen, Holbaek (DK); Thomas Barrack, Copthorne (GB); Daniel Thompson, Tonbridge (GB); Steffen Reymann, Guildford (GB)

(73) Assignee: Cubic Corporation, San Diego, CA (US)

( * ) Notice: Subject to any disclaimer, the term of this patent is extended or adjusted under 35 U.S.C. 154(b) by 135 days.

(21) Appl. No.: 17/241,644

(22) Filed: Apr. 27, 2021

(65) Prior Publication Data
US 2021/0375083 A1    Dec. 2, 2021

Related U.S. Application Data

(60) Provisional application No. 63/015,823, filed on Apr. 27, 2020.

(51) Int. Cl.
| | | |
|---|---|---|
| *G07C 9/10* | (2020.01) | |
| *H04N 7/18* | (2006.01) | |
| *G06V 20/52* | (2022.01) | |
| *G06V 40/20* | (2022.01) | |

(52) U.S. Cl.
CPC ............. *G07C 9/10* (2020.01); *G06V 20/52* (2022.01); *G06V 40/23* (2022.01); *H04N 7/188* (2013.01)

(58) Field of Classification Search
CPC .. G07C 9/10; G07C 9/00896; G07C 9/00944; G07C 9/00; G06V 20/52; G06V 40/23; G06V 40/00; H04N 7/188; E06B 11/02
See application file for complete search history.

(56) References Cited

U.S. PATENT DOCUMENTS

| | | | | |
|---|---|---|---|---|
| 2004/0093181 A1* | 5/2004 | Lee | ....................... | G08B 13/183 702/150 |
| 2006/0027649 A1* | 2/2006 | Kocznar | ............ | G07C 9/00944 235/382 |
| 2011/0167727 A1* | 7/2011 | Kamise | .................... | G07C 9/15 49/70 |
| 2015/0315840 A1* | 11/2015 | Reymann | ................. | G07C 9/28 49/31 |

(Continued)

FOREIGN PATENT DOCUMENTS

| | | |
|---|---|---|
| WO | 2021-146720 A1 | 7/2021 |
| WO | 2021-183671 A1 | 9/2021 |

OTHER PUBLICATIONS

Search Report dated Oct. 15, 2021 in related United Kingdom application No. 2105969.6, 3 pages.

*Primary Examiner* — Jared Walker
(74) *Attorney, Agent, or Firm* — Mughal Gaudry & Franklin PC

(57) ABSTRACT

A method for operating an adaptive gateline may include detecting a patron approaching a gateline. The method may include determining whether the gateline should be operated in a standard mode or in a modified mode based at least in part on data from one or more sensors. The method may include operating the gateline in the standard mode or in the modified mode based on the determination. In the modified mode a barrier of the gateline operates to provide one or both of extra time or additional space for the patron to pass through the gateline relative to the standard mode.

20 Claims, 7 Drawing Sheets

(56) References Cited

U.S. PATENT DOCUMENTS

| | | | | |
|---|---|---|---|---|
| 2015/0317841 A1* | 11/2015 | Karsch | .................. | G06V 20/52 |
| | | | | 348/149 |
| 2016/0055697 A1* | 2/2016 | Raina | ....................... | G07C 9/15 |
| | | | | 340/5.7 |
| 2016/0321849 A1* | 11/2016 | Reymann | ................ | E06B 11/08 |
| 2019/0304289 A1* | 10/2019 | Sol | .................... | G07C 9/00174 |
| 2020/0365002 A1* | 11/2020 | Modiano | .............. | A61B 5/7405 |

\* cited by examiner

ADAPTIVE GATELINE MOTOR CONTROL

CROSS-REFERENCE TO RELATED APPLICATIONS

This application claims the benefit of and is a non-provisional of U.S. Provisional Application Ser. No. 63/015,823 filed on Apr. 27, 2020, which is hereby expressly incorporated by reference in its entirety for all purposes.

BACKGROUND OF THE INVENTION

In public transportation access systems, patrons often gain access by passing through gates upon being successfully validated (such as by paying a required fare). Frequently, patrons will carry luggage and/or require additional needs. For example, some patrons may have disabilities and/or may be accompanied by young children and/or animals (including both services animals and pets). To accommodate such patrons, some current gate providers offer alternative physical hardware (often referred to as accessible gates) that are wider in physical nature and/or run different firmware as compared to the standard gates. These accessible gates operate differently than the standard gates to accommodate the needs of different patrons, but require the patrons themselves to determine to use the accessible gate. Existing gatelines are operated in fixed configurations, with each gate being designated as a standard gate or an accessible gate (which use different firmware). This may result in many patrons using a less suitable gateline, as the patron may not know which gateline to select. Additionally, patrons may be dissuaded from using an accessible gate due to long queueing lines that may build up due to the slower actuation of the accessible gateline. Therefore, improvements in accessible transit gatelines are desired.

SUMMARY OF THE INVENTION

In one embodiment, a method for operating an adaptive gateline is provided. The method may include detecting a patron approaching a gateline. The method may include determining whether the gateline should be operated in a standard mode or in a modified mode based at least in part on data from one or more sensors. The method may include operating the gateline in the standard mode or in the modified mode based on the determination. In the modified mode a barrier of the gateline may operate to provide one or both of extra time or additional space for the patron to pass through the gateline relative to the standard mode.

In some embodiments, in the modified mode, the barrier of the gateline may open slower, close slower, open wider, open with less force, close with less force, remain open longer, or any combination thereof as compared to the standard mode. The sensor data may be provided by one or more selected from a group comprising: a validation sensor, a mmWave sensor, an IR sensor, a time of flight sensors, and a camera. The method may include detecting that the patron has passed the barrier of the gateline. The method may include closing the barrier based on the detecting. The modified mode may be one of a plurality of distinct modified modes. Detecting the patron may include receiving validation information from the patron. Detecting the patron may be based on data from the one or more sensors.

In another embodiment, a method for operating an adaptive gateline may include detecting a patron approaching a gateline. The method may include determining that the gateline should be operated in a modified mode based at least in part on data from one or more sensors. The method may include operating the gateline in the modified mode based on the determination. In the modified mode a barrier of the gateline may operate to provide one or both of extra time or additional space for the patron to pass through the gateline relative to a standard mode.

In some embodiments, the method may include detecting an additional patron. The method may include determining that the gateline should be operated in the standard for the additional patron. The method may include operating the gateline in the standard mode based on determining that the gateline should be operated in the standard for the additional patron. The method may include detecting fare evasion behavior. The method may include sending information about the fare evasion behavior to a transit authority. The method may include capturing an image of the fare evasion behavior. The information about the fare evasion behavior may include the image. Detecting the patron may be based on data from one or both of a movement sensor and a proximity sensor. Detecting the patron may be based on image data from one or more cameras.

In another embodiment, an adaptive gateline is provided. The gateline may include a number of supports that define a pathway therebetween. The gateline may include a barrier that is movably disposed within the pathway. The gateline may include one or more sensors. The gateline may include at least one processor. The gateline may include a memory. The memory may have instructions stored thereon that, when executed, cause the at least one processor to detect a patron approaching a gateline. The instructions may cause the at least one processor to determine whether the gateline should be operated in a standard mode or in a modified mode based at least in part on data from the one or more sensors. The instructions may cause the at least one processor to operate the gateline in the standard mode or in the modified mode based on the determination. In the modified mode the barrier of the gateline may operate to provide one or both of extra time or additional space for the patron to pass through the gateline relative to the standard mode.

In some embodiments, detecting the patron may be based on data wirelessly received from a mobile device of the patron. The determination may be made based on a movement speed of the patron. The determination may be made based on validation information of the patron. The determination may be made based on optical data associated with the patron. The optical data may indicate the presence of one or more selected from a group comprising, a movement aid, a large object, a child, and an animal. The gateline may be one of a plurality of gatelines provided at an access point. Each of the plurality of gatelines may provide identical functionality.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
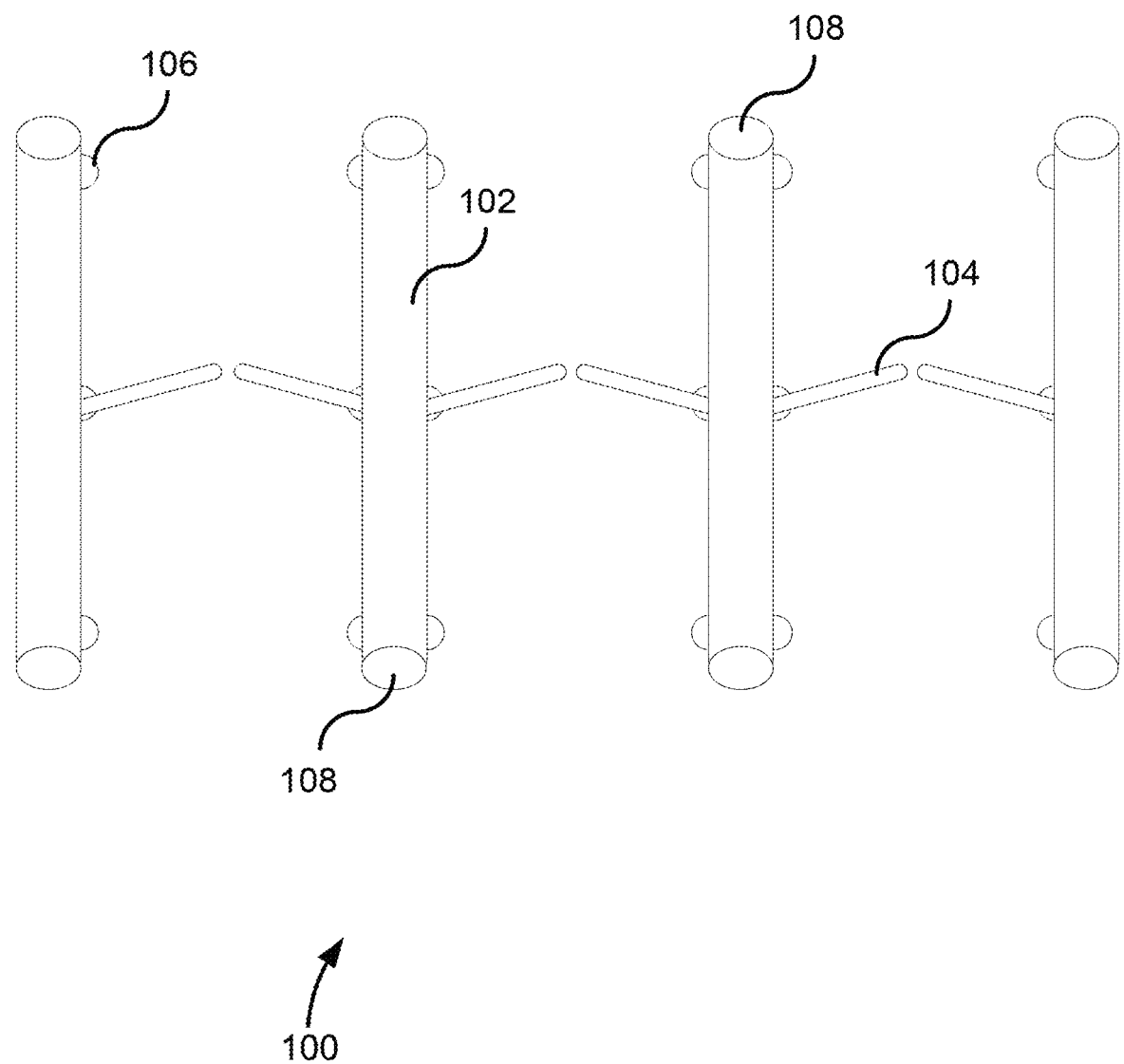
FIG. 1 depicts a schematic view of a number of gatelines in accordance with the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention(s) described herein are generally related to adaptive gateline motor control systems and methods. Embodiments may enable a single gateline to operate in a number of different modes to accommodate the needs of various users. While discussed primarily in relation to entry and exit points for transit systems, a person of ordinary skill in the art will understand that alternative embodiments may vary from the embodiments discussed herein, and alternative applications may exist (e.g., event venues, access-controlled areas, and the like).

Embodiments of the present invention are directed to gate designs that have a single set of physical hardware and that use adaptive software that responds to access validation information (such as fare media and/or biometric data), movement data, and/or optical data to identify a particular patron and/or knowledge about the patron. In response to this information, the gate may be able to configure itself into different modes to enable a different user experience (such as gate motion/actuation and/or timing) for different patrons. For example, the gate may open wider, remain open longer, and/or close slower to allow patrons with luggage, disabilities, and/or small children to pass through before the gate closes, while opening less wide, remaining open shorter, and/or closing quick for at least some other patrons. In some embodiments, a drive control system of the gate may determine how to operate for a given patron based on the information from the patron's fare media or other access credential. In some embodiments, the operation of the gate may be adjusted based on voice commands, which may be particularly useful in accommodating blind patrons. In some embodiments, sensor data may be used to adjust the operation of the gate. For example, movement sensors, optical sensors (including cameras,—visible light and/or IR cameras), proximity sensors, and/or other sensors may provide data about approaching patrons that may be used to control a mode of operation of the gate. It will be appreciated that any combination of sensor data, validation information, voice commands, and the like may be used to configure the gate to operate in a particular mode for one or more patrons.

The use of adaptive software (which may be firmware in some embodiment) to tailor the gate experience for different patrons enables one set of physical gate hardware to be used and operated in different manners to meet the needs of various patrons. For example, the gate may operate in a standard mode and one or more modified modes. In a modified mode, the gate may open slowly, remain open longer, open wider, open with more or less force, and/or otherwise operate different than when operating in the standard mode. This may enable the gate to accommodate the needs of patrons who need additional time to pass through the gate, while also being able to operate in a standard mode that ensures a high level of passenger throughput. Such gates enable real-time changes to the patron experience without the need for the patron to use specialized equipment. This enables gate providers to produce a single gate hardware profile, simplifying manufacturing, installation, and maintenance of gate. Additionally, as all gates at a particular entry/exit point may be identical, such adaptive gate configurations may result in more evenly distributed queuing and may simplify the selection of a gate for patrons, thereby enhancing the end-user experience. In some embodiments, the gates may include sensors that provide information that is used to tailor the gate response to the patron while also providing vital information on incorrect behavior to transit agencies. For example, the sensors may be able to detect fare evasion and/or other fraudulent behavior and may provide information to transit agencies to help catch fraudsters.

Turning now to FIG. 1, a top view of a number of gatelines 100 is illustrated. While shown here with three gatelines (or gates) 100, it will be appreciated that any number of gatelines 100 (including a single gateline 100) may be present in some embodiments. Here, each gateline 100 may include two side stanchions 102 and/or other support features that define an entryway and/or exit that allows patrons to enter or exit a transportation station once properly validated. The stanchions 102 of each gateline 100 may be positioned sufficiently far apart to provide a pathway that, when fully open, is large enough to accommodate patrons needing additional space, such as those in wheelchairs, having luggage, and/or are with small children. For example, the barriers 104 may be set to open between about 500 and 800 mm wide, more often between about 600 and 700 mm wide in a standard mode, and may open between about 800 and 1200 mm, more commonly between about 900 and 1100 mm when in a modified mode. In some embodiments, one or more of the gatelines 100 may share a stanchion 102 with another gateline 100 (as illustrated here), however in other embodiments, each gateline 100 may include its own designated stanchions 102. To gain access through the gatelines 100, each patron typically must be properly validated.

The patrons may be validated using any validation technique known now or in the future. For example, each patron may present an access credential (such as a ticket, pass, radio frequency (RF) device, smart phone, and/or other fare media) to a validation device positioned at or near the gateline 100. For example, in some embodiments a validation device 108 may be positioned on one or both sides of one or both of the stanchions 102. The validation device 108 may include a credential reader, such as a fare reader, which may be able to read physical media (such as paper tickets), optical identifiers (such as text, barcodes, QR codes, and the like), RF signals (such as NFC packets), and/or the like to validate whether a person may access the transportation system. In some embodiments, the access credential may include a stored value amount, a security level (such as for non-transit applications in which gateline 100 is used to control access to a secure area), a type of pass, an expiration date of the credential, identification information of the patron associated with the credential, and/or other credential. In some embodiments, the validation device 108 may be configured to validate patrons biometrically, such as by scanning a fingerprint, performing facial recognition using one or more cameras (not shown), and/or otherwise biometrically authenticating the patron. In some embodiments, the validation device 108 may be configured to validate access credentials stored on the patron's mobile device, such as by using a wireless connection such as Bluetooth Low Energy as the patron nears the gateline 100. In some embodiments, the validation device 108 may validate patrons prior to the patron entering the gateline 100. For example, the validation device 108 may wirelessly validate users that are within a signal range of the validation device 108. The validation device 108 (alone or in conjunction with other sensors) may monitor whether the patron actually passes through the gateline 100, and, upon such detection, the validation device 108 may deduct a journey, fare, and/or otherwise send an indication to a back-office that the patron has passed through the gateline 100. In some embodiments, received signal strength indicator (RSSI), location information, beacon signals, proximity sensors, and/or other sensors may be used to determine how close a particular patron is to the gateline 100 to ensure the gateline 100 opens at a proper time for each properly validated patron, without allowing non-validated patrons to pass through. In addition to properly validating the patrons, the validation device 108 may be configured to distinguish between particular fare types (child, adult, senior, special pass, etc.).

To control access to and/or from the transportation system, each gateline 100 may include one or more barriers 104 that extend across a pathway of the gateline 100. As illustrated, each stanchion 102 includes a respective barrier 104 that protrudes inward into the pathway. Barrier 104 may include turnstiles, paddles, panels, and/or other physical objects that obstruct the pathway of the gateline 100 when in a closed configuration. As illustrated, the barrier 104 includes two paddles, with one paddle coupled with and extending inward from a respective stanchion 102 of the gateline 100. In FIG. 1, the barrier 104 is in a closed position that prevents patrons from passing through the gateline 100. While closed, the barrier 104 may extend into a central portion of the pathway formed between the pair of stanchions 102, with ends of the barrier 104 touching or coming sufficiently close so as to impede the process of patrons who have not been properly validated for access through the gateline 100. While shown here with the barrier 104 slightly angled relative to the stanchions 102, it will be appreciated that in some embodiments the barrier 104 may be substantially orthogonal relative to the stanchions 102. The gatelines 100 may be able to operate in one or both directions, which may enable the gatelines 100 to be operated as entry gates, exit gates, and/or both entry and exit gates. In bi-directional embodiments, the gatelines 100 may be switched between being operated in an entry mode and an exit mode. The gateline 100 may include an actuator (not shown), such as a motor, which may move the barrier 104 between an open position and a closed position. The actuator may be configurable between a standard mode of operation and one or more modified modes of operation. For example, in a standard mode of operation, the actuator may be configured to move the barrier 104 at a predetermined speed, duration, distance (creating a pathway between the stanchions 102 of a set distance), and/or other parameters. The parameters may be set such that the barrier 104 moves in a manner that accommodates a majority of patrons in a quick manner to help maximize throughput through the gateline 100. In a modified mode, one or more of the parameters of the barrier 104 and actuator may be altered to accommodate the needs of different patrons. For example, one or more of the parameters may be adjusted to give the patron more time and/or space to pass through the gateline 100. In some embodiments, a single modified mode may be utilized for all non-standard patrons, while in other embodiments, a number of different modified modes may be utilized. For example, the gateline 100 may operate in a first modified mode for patrons in wheelchairs, a second modified mode for patrons having walking aids (walkers, canes, crutches, etc.), a third modified mode for patrons carrying and/or otherwise having large objects (luggage, bags, groceries, etc.), and/or a fourth mode for patrons with small children. It will be appreciated that the above modified mode use cases are merely examples and that any number of modified modes for various patrons may be utilized in various embodiments.

In some embodiments, some or all of the modified modes may operate with a fixed set of operating parameters associated with the given mode. In some embodiments, some or all of the modified modes may be adaptable to a given passage of a patron through a gate, such that two similarly classified patrons may have different experiences. For example, one or more sensors (such as imaging sensors, motion sensors, proximity sensors, and the like) may be used to monitor the movement and position of the patron through the gateline 100. Based on the sensed movement (direction, rate of speed, etc.) and/or position of the patron, the gateline 100 actuator may adapt one or more parameters (speed, duration, distance, etc.) of movement of the barrier 104 to meet the needs of the individual patron. For example, if the patron is moving particularly slowly, the gateline 100 may remain open longer, and if the patron is moving quicker than expected, the gateline 100 may close earlier to help increase throughput through the gateline 100.

In the present invention, each gateline 100 within a set of gatelines may have identical (or substantially similar, such as when outermost gatelines 100 have an outer stanchion that is not shared with another gateline 100) hardware, and may be capable of the same functionality to enable variable operation to accommodate users with different accessibility needs. To achieve such end results, the gatelines 100 and/or area proximate the gatelines 100 may include one or more sensors 106, such as proximity sensors, cameras, IR sensors, beacons, LIDAR sensors, millimeter wave (mmWave) sensors, time of flight (ToF) sensors, and the like, which are configured to detect 1) the difference between a child patron, adult patron, and/or object (such as a bag) and/or 2) the presence of a tailgater. The sensors 106 may be configured to provide an approximate size of a patron/object, detect a speed of a patron/object, detect a position of a patron/object, and/or detect the presence of patrons and/or other objects within or proximate the gateline 100.

The data from the sensors 106 may be cross-referenced and/or otherwise compared to data from the validation device 108. This may enable the gatelines 100 to identify patrons that need the gateline 100 to operate in modified modes and/or to identify fare evasion and/or other improper behavior. For example, the sensors 106 may detect that a person is carrying, pushing, and/or pulling an object, such as luggage, a bag, a stroller, and/or other large object. The detected presence of the object may cause the barrier 104 to operate in a modified mode. For example, the barrier 104 may open slower, open wider, open/close with less force (so as to not knock over or otherwise impact a patron too hard), remain open longer, and/or close slower than a standard mode of operation. Similar actions may be taken in other situation that may trigger the gateline 100 to operate in a modified mode. For example, a modified mode may be triggered if one or more children are detected (using validation data and/or data from sensors 106) and/or when a senior is detected (such as based on the validation data and/or data from sensors 106). In some embodiments, the validation data and/or sensor data may indicate that a user is disabled, such as by detecting the presence of a movement aid (e.g., a wheelchair, cane, walker, crutches, etc.) and/or based on a type of ticket presented (or based on other information associated with the ticket, such as profile information of a user holding the ticket). In such embodiments, the gateline 100 may cause the barrier 104 to operate in a modified mode to open slower, open wider, open with less force, remain open longer, and/or close slower than a standard mode of operation.

In some embodiments, the speed of the patron may be monitored throughout the passage process, with the speed of the patron being used to control the speed of operating of the gateline 100. For example, sensors 106 may be used to determine a rate of speed of a given patron. The rate of speed may be used to determine a time needed to pass through the gateline 100, and one or more parameters of the actuator/barrier 104 may be adjusted accordingly. For example, if a particular patron is moving through the gateline 100 at a particularly slow speed, the gateline 100 may hold the barriers 104 open longer and/or close the barriers 104 at a slower rate to accommodate the patron's slower pace. In some embodiments, the movement speed of a patron may be used to modify the operation of gateline 100 for standard patrons as well. For example, the gateline 100 may hold the barriers 104 open longer and/or close the barriers 104 at a slower rate to accommodate the patron's slower pace or may open the barriers 104 quicker to accommodate a patron's quicker pace. After each patron, the gateline 100 may revert to a standard mode of operation until validation and/or sensor data indicates that a modified mode is necessary. In this manner, each gateline 100 may accommodate users of all accessibility levels, while still maintaining a high level of passenger throughput. Regardless of the current operating mode of the gateline 100, the gateline 100 may close the barrier 104 based on movement speed and/or object/patron detection to prevent the barrier from impacting the patron or other object. For example, one or more of the sensors 106 may detect the presence of the patron (or other object) within the movement path of the barrier 104. The gateline 100 may delay the closing of the barrier 104 until the patron or object has cleared the barrier 104 path. In some embodiments, the barrier 104 may be unable to avoid contacting a patron or object. To account for such situations, the barrier 104 may be configured to close with a predetermined amount of force that is at or below a particular threshold to eliminate or otherwise decrease the likelihood that impact from the barrier 104 would be sufficiently forceful to injure or knock over a patron. Additionally, the barrier 104 and/or actuator may include sensors that may detect when the barrier 104 impacts a patron or object, which may trigger the barrier 104 to reverse direction (e.g., close if impact occurs during opening of barrier 104 and open if impact occurs during closing of barrier 104).

In some embodiments, when the sensor data and the validation data does not match, the gateline 100 may determine that fare evasion behavior is likely. For example, the sensors 106 may determine that one or more patrons are tailgating, as a single validation event may be recorded while multiple patrons are detected as approaching and/or attempting to pass through the gateline 100. The gateline 100 may also be able to determine when a patron uses an incorrect fare type. For example, the validation device 108 may detect that a patron is using a reduced fare pass (such as a child, senior, or special pass), while the sensors 106 may determine that the patron does not meet the required criteria for using such a pass. For example, the patron may present a child pass, while the sensors 106 determine that the patron's physical characteristics (facial structure, size, etc.) do not match that of a child. In some embodiments, when the gateline 100 detects behavior that indicates possible fare evasion (such as tailgating, multiple users attempting to simultaneously squeeze through the gateline 100 side by side, and/or other fare evasion behavior), the gateline 100 may alert the patron (such as by using an audio and/or visual indicator mechanism) that a mismatch was detected, providing the patron an opportunity to rectify any issues. In some embodiments, when possible fare evasion behavior is detected, the gateline 100 may alert one or more authorities, such as police and/or transit authority officers to address the situation. For example, upon detecting the possible fare evasion behavior, the gateline 100 may aggregate data about the behavior and transmit the information to a transit authority or other entity. In some embodiments, the information may include a time and/or date of the activity, information about any credentials presented during the activity, an image (still and/or video) of the persons involved in the activity, identification information associated with the persons involved (if available, such as from validation information, biometric identification such as facial recognition), and/or other information.

Figure 2:
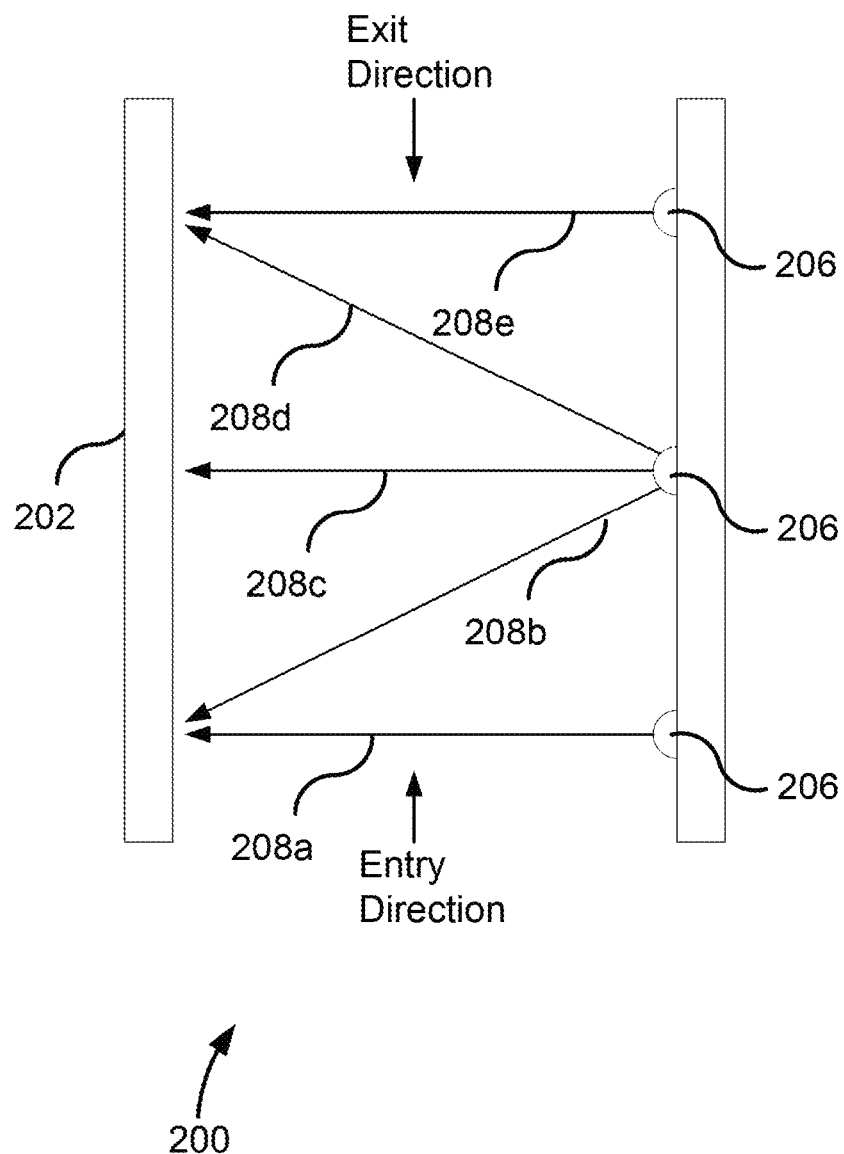
FIG. 2 depicts a schematic view of a gateline sensor arrangement in accordance with the present invention.

In some embodiments, each gateline may be designed to avoid impacts with patrons and/or other objects where possible through the use of good sensor signal coverage of the gate area (considered to be within the path of the moving barriers) with sensing technology. In the case of an obstruction and forced or fare evasion entry attempts, the gateline may maintain conformance to applicable industry standards for forces exerted on objects. FIG. 2 illustrates a diagram of a single gateline 200 that shows one example of a physical path arrangement of sensor beams within gateline 200. Gateline 200 may be similar to gateline 100. As illustrated, the gatelines includes two stanchions 202 that define the physical pathway. Sensors 206 may produce various detection beams 208 that may be used to monitor the progress of patrons. At an entry side of the gateline 200, actuation of a barrier movement routine may be initiated when the patron presents a valid media card and/or is otherwise validated by a validation device. For example, at an exit side of the gateline, the barrier movement routine may be initiated by one of two modes: 1) a "tap on exit" mode that requires a patron to present of valid media or be otherwise validated and 2) a "free exit" mode that triggers the barrier movement when an exit sensor is broken. As illustrated, gateline 200 includes a number of sensors 206 that may produce the various sensor beams 208 shown. Oftentimes, the sensors 206 may be mmWave sensors and/or IR sensors, however other sensor types are possible. During exit, if the barrier (not shown) is in the closed position and needs to be driven to the open position, the beam 208d and beam 208e may be checked before the barrier is repositioned. If either beam 208*d* or 208*e* is blocked, the barrier may not be driven. If both beams 208*d* and 208*e* are unblocked, the barrier may be driven and the subsequent state of the sensor 206 may be ignored. Additionally, during exit, the beam 208*c* and beam 208*e* together may be used to monitor passenger flow in the exit direction when the gateline 200 is in an exit open mode. In this direction the other beams 208 may be ignored.

When entering the gateline 200, if the barrier is in the closed position and needs to be driven to the open position, the beam 208*b* and beam 208*a* may be checked before the barrier is repositioned. If either beam 208*b* or 208*a* is blocked, the barrier may not be driven, if both beams 208*b* and 208*a* are unblocked, the barrier may be driven and the subsequent state of the sensor 206 is ignored. Additionally, during entry, the beam 208*c* and beam 208*a* together may be used to monitor passenger flow in the entry direction when the gateline 200 is in an entry open mode. In this direction the other beams 208 may be ignored.

One example of sensor beam logic of the gateline 200 is described in detail below, although variations are possible in some applications. Note that all beam numbers are referenced for the entry direction. For a gate working in exit mode, the opposite beam arrangement may be used. 1) A credit timer may be initiated either when the barrier opens or when a credit is granted (if the barrier is already open). A credit timer may be the time limit set to allow a 'credit' or signal for valid passage of one person to traverse the walkway. The credit may be a stored 'message' or signal that the gateline 200 uses to go to into an open mode, and then wait for an object/passenger to traverse the walkway. Embodiments may attribute one credit to enable a single patron/object to move from threshold to threshold (i.e. entrance to exit or exit to entrance).

If the barrier is inhibited from opening due to beam blockage, the credit timer may not start until the barrier opens. 2) The credit timer is restarted when a credit is used, providing that a credit still remains in the store. 3) The barrier will not open unless beams 208*d* and 208*e* are clear. 4) If the barrier is held closed for this reason, the credit timer will not start until the barrier opens. The barrier will never close if beam 208*d* is blocked, provided that at least one other beam 208 is clear, and subject to conditions 7) and 8) below. 5) If all beams 208 are blocked together for a predetermined period of time (such as between about 5 and 10 seconds, commonly about 7.5 seconds), the barrier will close and the credit store will be cleared. 6) A barrier close delay of a set amount of time (such as between 0 and 2 seconds, commonly about 0.5 seconds) will be started either by clearance of beam 208*d* when no credits are left, or on blockage of beam 208*e* when no credits are left and if beam 208*d* has already cleared. The barrier will not close until expiry of this timer, provided that beams 208*a-c* are clear during this period. If beams 208*a-c* become blocked, then the barrier will close immediately. 7) If the barrier is due to close but is held open by beam 208*d* being blocked, then the barrier will close following a predetermined period (such as between 5 and 30 seconds, oftentimes about 15 seconds) where no beams 208 change state. 8) If the barrier is due to close but is being held open by beam 208*d* being blocked, then the transitions from cleared to blocked may be counted for beams 208*c-e*. When any beam count reaches a predetermined value (such as between 1 and 5, commonly 3), then the barrier will close regardless of beam state. 9) Passenger Detection Logic may only monitor beams 208*c* and 208*e*, and these beams alone may be used to count the passengers to remove credits. The opening and closing of the barrier may be dependent on the credit store value is governed by the above rules. 10) The passage detection logic may only be active while there is at least one credit stored and the barrier has been commanded to open. 11) A credit may be used only when beam 208*e* is seen to be blocked after beam 208*c* changes from blocked to clear. 12) Normally the beam logic direction may follow the direction of the barriers. However in one mode, the patron may walk through the gateline 200 in either direction.

In some embodiments, additional sensors may be utilized. For example, an additional four beams may be added in a logic series electronic circuit with beams 208*a* and 208*e*, therefore increasing the total beam count to nine. The beams 208 may be linked in an 'OR' logic circuit via a PAC daughterboard in order to allow the addition of two extra beam positions at the extreme ends of the gateline 200, thus providing increased geometric coverage. For example, the additional beams 208 may be positioned at a lower height than beams 208*a*-208*e*. Such coverage may provision sensor detection of shorter patrons, such as children.

Figure 3:
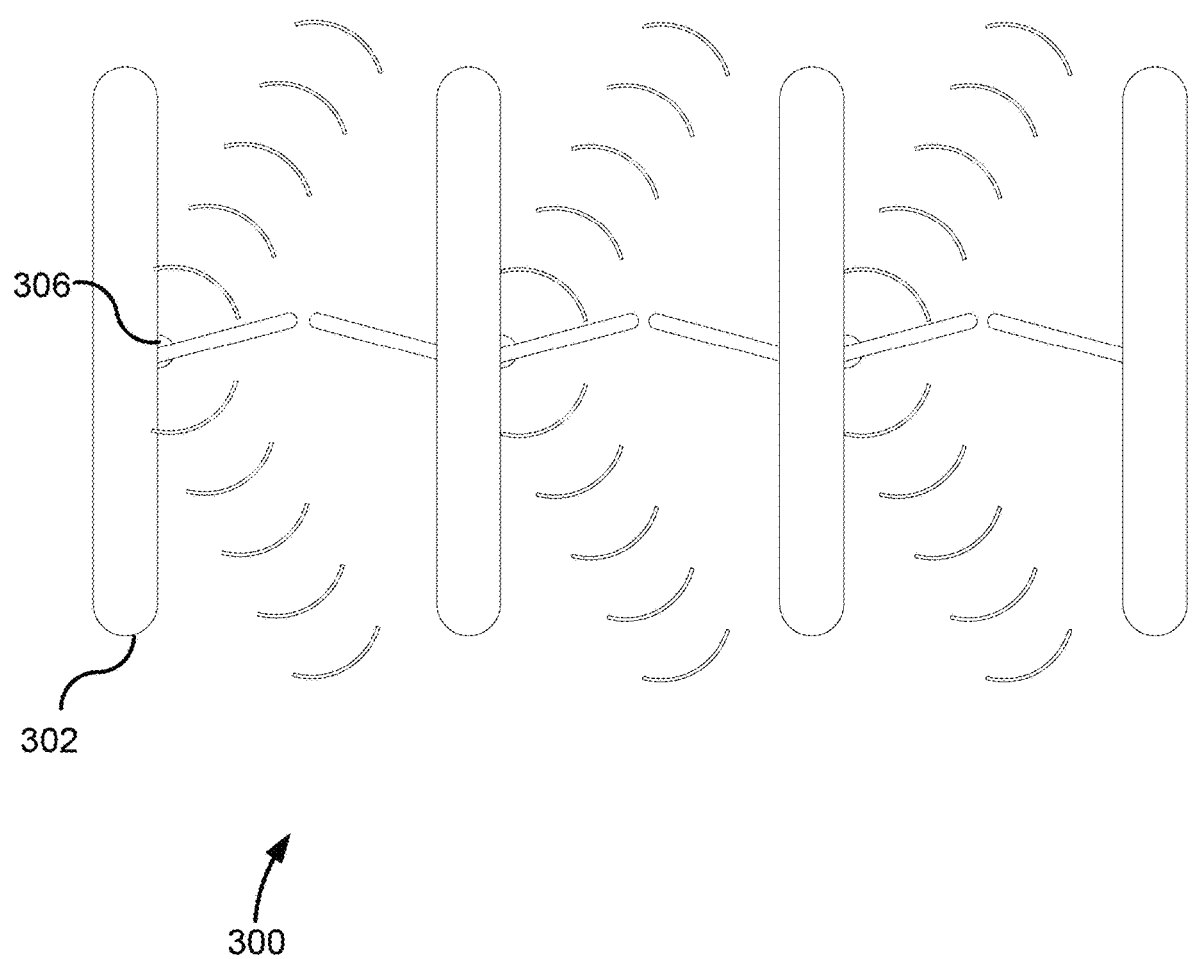
FIG. 3 depicts a schematic view of a sensor arrangement of a number of gatelines in accordance with the present invention.
Figure 4:
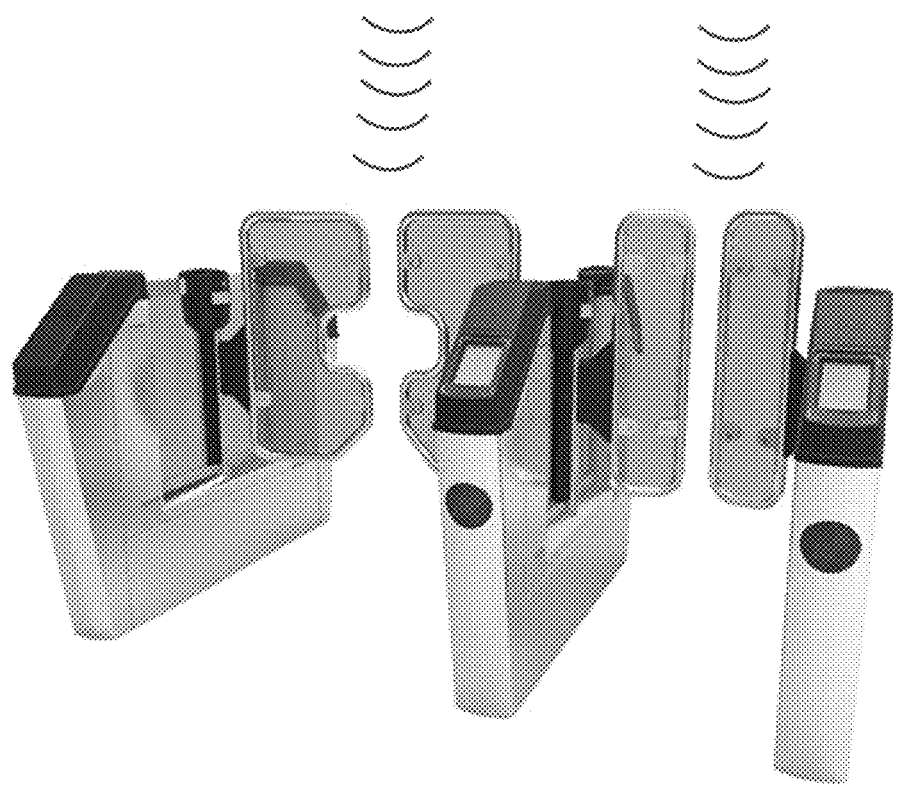
FIG. 4 depicts a schematic view of a sensor arrangement of a number of gatelines in accordance with the present invention.

As illustrated in FIG. 3, some gatelines 300 may utilize mmWave sensors 306 that are positioned within a middle of a gateline stanchion 302. Gateline 300 may be similar to gatelines 100 and 200 and may include any of the features described above. In some embodiments, the mmWave sensors 306 may be directed in both an entry and exit direction, which may enable the gateline 300 to operate bi-directionally. Additionally, this position allows for a wider 3D sphere of received signal on the approach of a patron to the gateline 300. In some embodiments, the use of mmWave sensors enables not only the tracking of the presence, size, and/or speed of a patron, but may also be used to determine whether a patron is carrying or concealing a bomb or other malicious object, similar to its use in airport environments. These sensors enable the patrons to have a normal passage experience, but also allows for scanning of persons of interest. For example, during high risk times and/or in high risk areas, some or all passengers may be scanned for malicious items as the patrons pass through the gateline 300. In some embodiments, rather than placing mmWave sensors on or within the stanchions 302, the mmWave sensors (or other sensors) may be positioned above a gateline, such as illustrated in FIG. 4. Such positioning provides a singular aspect to the gateline. For example, when placed at an appropriate position of height, the sensor will be able to view and cover the gateline pathway in a zonal pattern.

Figure 5:
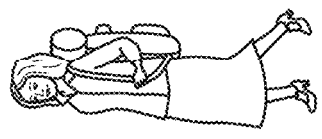
FIG. 5 depicts object detection using mmWave sensors of a gateline in accordance with the present invention.
Figure 5:
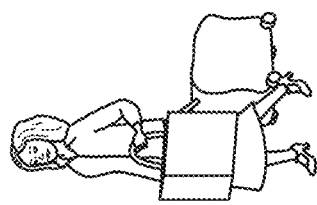
Figure 5:
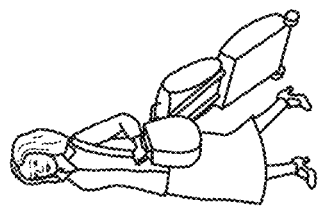
Figure 5:
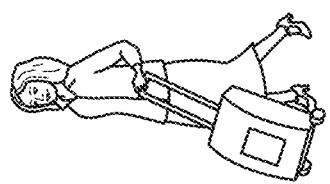
Figure 5:

FIG. 5 illustrates the capabilities of mmWave sensors that use differing wave intensity reflections to detect various patrons and/or objects. For example, use of mmWave sensors enable the detection and differentiation of objection (both a type and size; e.g., a bag compared to an adult human) without the use of multiple sensors or complementary systems (e.g., use of camera and IR together). Embodiments of the present invention utilize algorithms that enable the interpretation of received signals to use measured peak voltage ranges and a determination of peak to peak waveforms to indicate the presence of a trailing object, multiple objects, and/or object sizes within expected parameters. The algorithm may be tailored based on the mmWave response received and a pattern of signal peak to peak received to determine the object shape and density.

Figure 6:
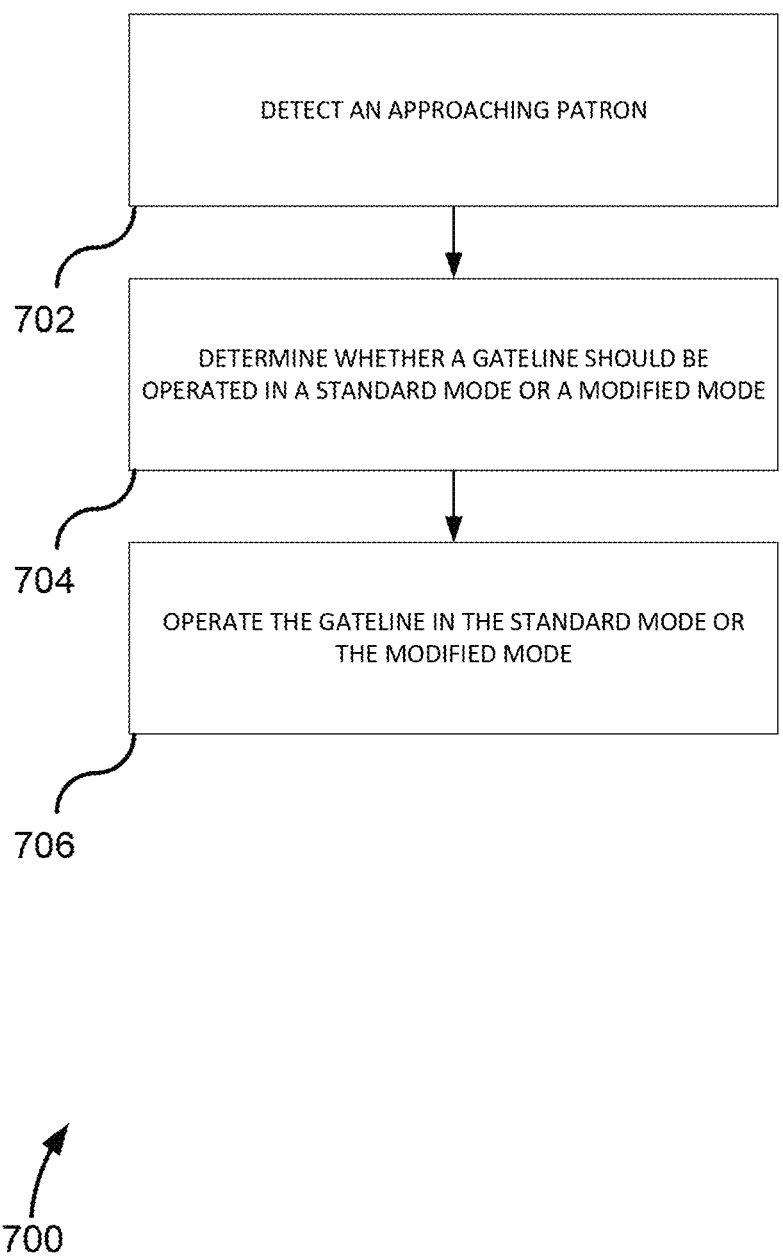
FIG. 6 depicts a flowchart of a process for operating an adaptive gateline according to embodiments of the present invention.

FIG. 6 is a flowchart illustrating a process 600 for operating an adaptive gateline in accordance with the present invention. Process 600 may be performed using any of the gatelines described herein and may begin by detecting an approaching patron at operation 602. In some embodiments, this may be done using data from one or more sensors. For example, mmWave sensors, validation sensors (such as validation device 108), IR sensors, cameras, and/or other sensors may be used to monitor patrons who are approaching the gateline. At operation 604, a determination may be made as to whether the gateline should operate in a standard mode or a modified mode. For example, information from some or all of the sensors may be used to determine that a particular patron is a standard patron and/or someone who may need the gateline to operate in the modified mode, which may be a standardized modified mode and/or one of a number of modified modes. For example, a patron may be detected, using movement, proximity, and/or optical sensors (such as cameras) as being a senior, a child, an animal (such as a service animal and/or pet), a patron holding, pushing, and/or pulling a large item, a patron utilizing a movement aid (walker, crutches, cane, wheelchair, scooter, etc.), and the like. In some embodiments, the determination may include detecting that the patron may be moving at a slower pace for various reasons, which may necessitate operating the gateline in a modified mode. In some embodiments, the determination of whether a patron needs the modified mode may also be based on validation data. For example, the validation of the patron's media may indicate the that patron is carrying a child or senior pass and may need the accessibility mode and/or may indicate that the patron has a special pass that indicates some special gateline accommodations be made that requires the gateline to operate in the modified mode.

Once the determination is made, the gateline may be activated in the proper mode at operation 606. For example, for patrons who are deemed to not require any adjustments, the gateline 100 may be operated (opened and/or closed) in the standard mode. For patrons needing special considerations, the gateline may be operated in the modified mode. In the modified mode, the barrier may operate to provide one or both of extra time or additional space for the patron to pass through the gateline relative to a standard mode. For example, the barrier of the gateline may open/close slower, open wider, open with less force, remain open longer, and/or close slower than in the standard mode of operation. In some embodiments, the sensors may monitor the patron's pace and/or otherwise monitor the progress of the patron through the gateline. This information may be used to customize the speed and/or timing of the opening and/or closing of the gateline to ensure that the gateline remains open sufficiently long for accessibility mode patrons to safely pass through the gateline. This process may be repeated to each patron, enabling a single gateline to accommodate patrons of varying mobility levels, while ensuring that the gateline operates in the standard mode where possible in order to maintain a high level of passenger throughput.

In some embodiments, the process may include detecting that the patron has passed the barrier of the gateline. For example, movement, proximity, and/or optical sensors may detect the movement and/or position of the patron within or proximate the gateline and enable the gateline to determine when the patron has moved beyond the movement path of the barrier. Upon such determination, the gateline may close the barrier prior to admitting a subsequent patron. In some embodiments, the process may include detecting fare evasion behavior. For example, cameras and/or other sensors may detect a person jumping the barrier, tailgating, and/or otherwise attempting to evade paying a fare or otherwise being validated. In such instances, the gateline may send information about the fare evasion behavior to a transit authority or other entity. In some embodiments, the gateline may capture one or more images (still and/or video) of the fare evasion behavior. The image(s) may be sent to the authorities as part of the information about the fare evasion behavior.

Figure 7:
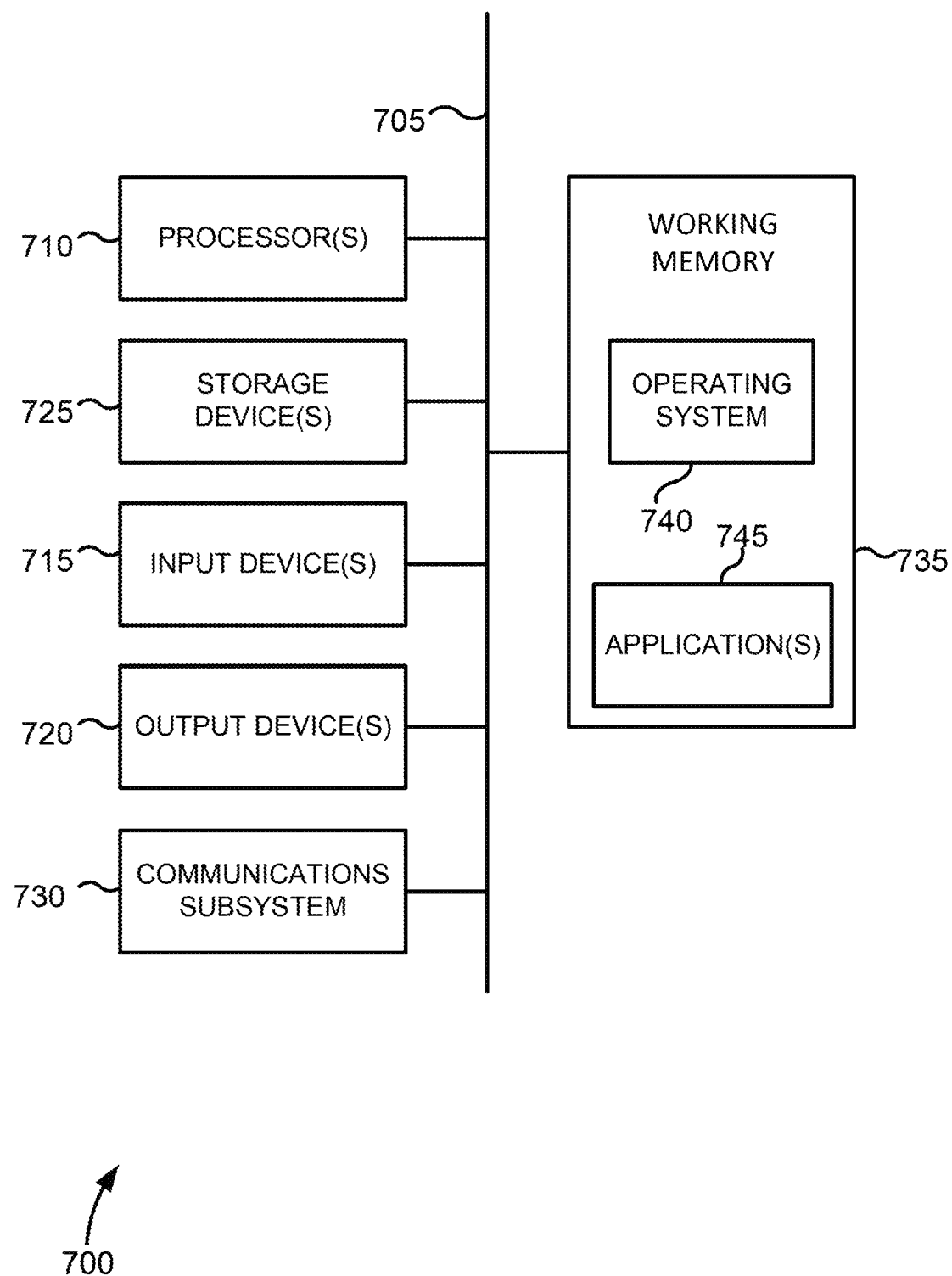
FIG. 7 is a block diagram of a computer system in accordance with the present invention.

A computer system as illustrated in FIG. 7 may be incorporated as part of the previously described computerized devices. For example, computer system 700 can represent some of the components of computing devices, such as the various gatelines, and/or other computing devices described herein. FIG. 7 provides a schematic illustration of one embodiment of a computer system 700 that can perform the methods provided by various other embodiments, as described herein. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, including without limitation one or more processors, such as one or more special-purpose processors (such as digital signal processing chips, graphics acceleration processors, and/or the like); one or more input devices 715, which can include without limitation a keyboard, a touchscreen, receiver, a motion sensor, a camera, a smartcard reader, a contactless media reader, and/or the like; and one or more output devices 720, which can include without limitation a display device, a speaker, a printer, a writing module, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processing unit 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire, and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processing unit 710.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for operating an adaptive gateline, comprising:
   detecting a patron approaching a gateline;
   determining whether the gateline should be operated in a standard mode or in a modified mode based at least in part on data from one or more sensors; and
   operating the gateline in the standard mode or in the modified mode based on the determination, wherein:
   in the modified mode a barrier of the gateline operates to provide one or both of extra time or additional space for the patron to pass through the gateline relative to the standard mode,
   the data is generated based on beam information from the one or more sensors, and
   an opening or closing of the barrier is performed based on a timer that changes according to change in the beam information from the one or more sensors.

2. The method for operating an adaptive gateline of claim 1, wherein:
   in the modified mode, the barrier of the gateline opens slower, closes slower, opens wider, opens with less force, closes with less force, remains open longer, or any combination thereof as compared to the standard mode.

3. The method for operating an adaptive gateline of claim 1, wherein:
   the sensor data is provided by one or more selected from a group comprising: a validation sensor, a mmWave sensor, an IR sensor, a time of flight sensors, and a camera.

4. The method for operating an adaptive gateline of claim 1, further comprising:
   detecting that the patron has passed the barrier of the gateline; and
   closing the barrier based on the detecting.

5. The method for operating an adaptive gateline of claim 1, wherein:
   the modified mode is one of a plurality of distinct modified modes.

6. The method for operating an adaptive gateline of claim 1, wherein:
   detecting the patron comprises receiving validation information from the patron.

7. The method for operating an adaptive gateline of claim 1, wherein:
   detecting the patron is based on data from the one or more sensors.

8. A method for operating an adaptive gateline, comprising:
   detecting a patron approaching a gateline;
   determining that the gateline should be operated in a modified mode based at least in part on data from one or more sensors; and
   operating the gateline in the modified mode based on the determination, wherein:
   in the modified mode a barrier of the gateline operates to provide one or both of extra time or additional space for the patron to pass through the gateline relative to a standard mode, the data is generated based on beam information from the one or more sensors, and an opening or closing of the barrier is performed based on a timer that changes according to change in the beam information from the one or more sensors.

9. The method for operating an adaptive gateline of claim 8, further comprising:
detecting an additional patron;
determining that the gateline should be operated in the standard for the additional patron; and
operating the gateline in the standard mode based on determining that the gateline should be operated in the standard for the additional patron.

10. The method for operating an adaptive gateline of claim 8, further comprising:
detecting fare evasion behavior; and
sending information about the fare evasion behavior to a transit authority.

11. The method for operating an adaptive gateline of claim 10, further comprising:
capturing an image of the fare evasion behavior, wherein the information about the fare evasion behavior comprises the image.

12. The method for operating an adaptive gateline of claim 8, wherein:
detecting the patron is based on data from one or both of a movement sensor and a proximity sensor.

13. The method for operating an adaptive gateline of claim 8, wherein:
detecting the patron is based on image data from one or more cameras.

14. An adaptive gateline, comprising:
a number of supports that define a pathway therebetween;
a barrier that is movably disposed within the pathway;
one or more sensors;
at least one processor; and
a memory having instructions stored thereon that, when executed, cause the at least one processor to:
detect a patron approaching a gateline;
determine whether the gateline should be operated in a standard mode or in a modified mode based at least in part on data from the one or more sensors; and
operating the gateline in the standard mode or in the modified mode based on the determination,
wherein:
in the modified mode the barrier of the gateline operates to provide one or both of extra time or additional space for the patron to pass through the gateline relative to the standard mode,
the data is generated based on beam information from the one or more sensors, and
an opening or closing of the barrier is performed based on a timer that changes according to change in the beam information from the one or more sensors.

15. The adaptive gateline of claim 14, wherein:
detecting the patron is based on data wirelessly received from a mobile device of the patron.

16. The adaptive gateline of claim 14, wherein: the determination is made based on a movement speed of the patron.

17. The adaptive gateline of claim 14, wherein:
the determination is made based on validation information of the patron.

18. The adaptive gateline of claim 14, wherein:
the determination is made based on optical data associated with the patron.

19. The adaptive gateline of claim 18, wherein:
the optical data indicates the presence of one or more selected from a group comprising, a movement aid, a large object, a child, and an animal.

20. The adaptive gateline of claim 14, wherein:
the gateline is one of a plurality of gatelines provided at an access point; and each of the plurality of gatelines provides identical functionality.

* * * * *